United States Patent [19]

Ivan

[11] Patent Number: 4,600,352
[45] Date of Patent: Jul. 15, 1986

[54] SPARE TIRE HANDLING MECHANISM

[75] Inventor: Steve D. Ivan, St. Clair Shores, Mich.

[73] Assignee: Gulf & Western Manufacturing Company, Southfield, Mich.

[21] Appl. No.: 631,821

[22] Filed: Jul. 18, 1984

[51] Int. Cl.[4] .................................................. B62D 43/04
[52] U.S. Cl. ................................ 414/463; 242/54 R; 242/86.5 R
[58] Field of Search ................ 414/463, 466; 242/117, 242/54 A, 54 R, 86.5 R

[56] References Cited

U.S. PATENT DOCUMENTS

| | | | |
|---|---|---|---|
| 149,047 | 3/1874 | Lovell | 242/117 |
| 514,262 | 2/1894 | Denton | 242/117 |
| 821,708 | 5/1906 | Edward | 242/117 |
| 871,687 | 11/1907 | Frink | 65/188 |
| 1,155,181 | 9/1915 | Wilkinson | 114/146 |
| 1,179,309 | 4/1916 | Henshaw | 242/117 |
| 1,874,077 | 8/1932 | Anderson | 16/1 C |
| 1,983,767 | 12/1934 | Mueller | 224/29 |
| 2,219,500 | 10/1940 | West | 242/77 |
| 2,325,848 | 8/1943 | Gildea et al. | 224/29 |
| 2,817,447 | 12/1957 | Bianca | 414/663 |
| 2,855,162 | 10/1958 | Schacht | 242/117 |
| 3,105,652 | 10/1963 | Becker et al. | 242/107.4 |
| 3,212,727 | 10/1965 | Fonden et al. | 242/117 |
| 3,372,821 | 3/1968 | Podhajsky | 414/463 |
| 3,390,864 | 7/1963 | Searcy et al. | 254/166 |
| 3,395,819 | 8/1968 | Fruetel | 414/463 |
| 3,539,152 | 11/1970 | Paul | 254/166 |
| 3,542,413 | 11/1970 | Hardison | 294/86 |
| 3,554,397 | 1/1971 | Cluff | 414/463 |
| 3,853,205 | 12/1974 | Gindroz | 187/27 |

Primary Examiner—Robert J. Spar
Assistant Examiner—Janice Krizek
Attorney, Agent, or Firm—Body, Vickers & Daniels

[57] ABSTRACT

A spare tire handling mechanism is disclosed which is of the character mounted on a vehicle for displacing a spare tire between a stored position beneath the vehicle chassis and an accessible position therebelow and in which the spare tire engages ground and can be pulled out from beneath the vehicle. The spare tire is supported in the stored position by means of a cable having an end with which the tire is releaseably interengaged, and the tire is adapted to be elevated to and lowered from the stored position by means of a rotatable cable drum. The drum has different diameter portions oriented relative to one another for rotation of the drum in the winding direction to wind the cable on the larger diameter portion when there is no or little load on the cable and to wind the cable on the smaller diameter portion when the cable is loaded to elevate the tire from ground to its stored position.

9 Claims, 10 Drawing Figures

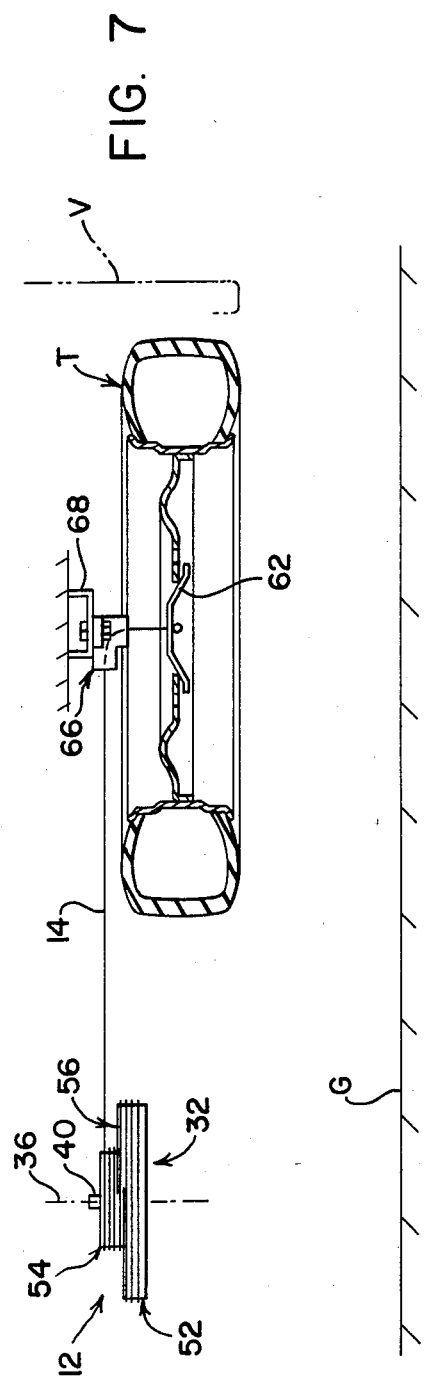
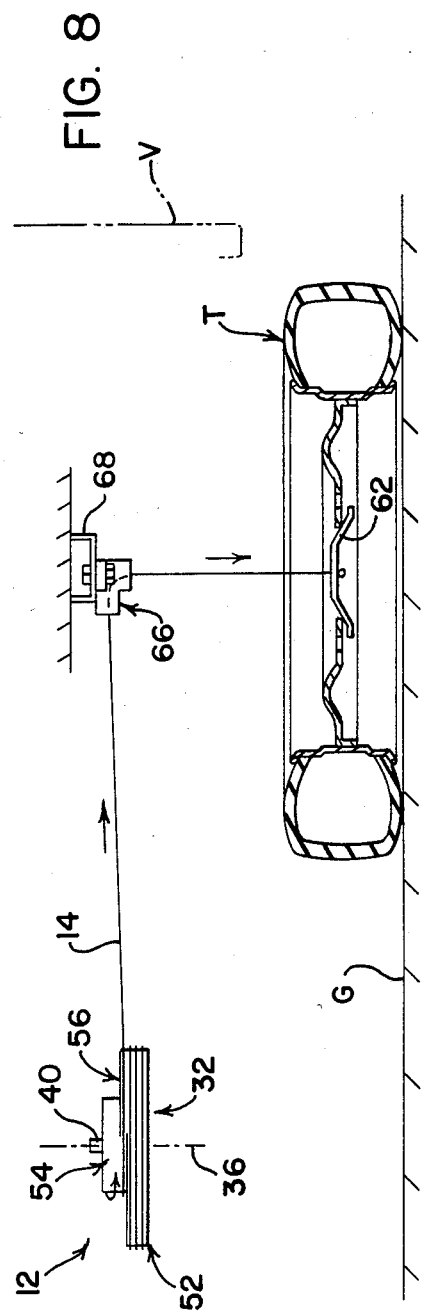

SPARE TIRE HANDLING MECHANISM

BACKGROUND OF THE INVENTION

This invention relates to the storage of spare tires or wheels under vehicles and, more particularly, to cable and drum type mechanisms by which a spare tire is supported in a stored position beneath the vehicle chassis and is lowerable from the stored position to an accessible position in which the tire engages the ground beneath the vehicle.

Mechanisms of the character to which the present invention relates have been provided heretofore and, generally, have included some form of a rod or pipe providing a reel or drum which is rotatable in opposite directions to provide for the winding and unwinding of a cable or other flexible connector relative thereto. Such cable or connector has a free end adapted to be releaseably interconnected with a spare tire and, when the cable is wound onto the drum, the spare tire is elevated into a storage position beneath the vehicle. Upon rotation of the drun in the opposite direction to unwind the cable, the spare tire is lowered to ground beneath the vehicle and, generally, is then pulled from beneath the vehicle and disconnected from the cable to enable use of the tire. Exemplative prior art devices of this character are shown in U.S. Pat. Nos. 1,983,767 to Mueller; 3,372,821 to Podhajsky; 3,539,152 to Paul; 3,542,413 to Hardison; and, 3,554,397 to Cluff.

The storage of a spare tire beneath the chassis of a vehicle is advantageous for a number of reasons including the optimizing of available storage space and the aesthetics of interior portions of the vehicle where spare tires are generally stored. Such storage also avoids having to physically lift the spare tire to remove it from within the vehicle and the potential soiling or damaging of the clothes of the person doing so.

While cable and drum type mechanisms heretofore available can provide these advantages, there are disadvantages with respect to the structure and operation of the prior mechanisms which have limited acceptability thereof. In this respect, displacement of a spare tire from its stored position first requires unwinding rotation of the reel or drum to lower the tire into engagement with the ground beneath the vehicle. The tire must then be pulled rearwardly of the vehicle in order to achieve separation of the tire from the cable. Return of a replaced tire or a new spare tire to the stored position is achieved by reversing the above procedure and, generally, the tire with the cable reconnected thereto is first pushed into position under the vehicle before the drum or reel is rotated to rewind the cable thereonto. It will be appreciated that the elevating of the tire from the ground to its stored position imposes the greatest load on the reel or drum and accordingly requires the greatest exertion of force to rotate the reel or drum. In order to minimize the latter, the reel or drum in the mechanisms heretofore provided has been defined by a small diameter rod or tube so as to minimize the torque on the drum and thus the force required to rotate the drum in elevating the tire. While the small diameter rod serves its purpose in this respect, a considerable amount of excess cable is required to enable withdrawal of the spare tire outwardly from beneath the vehicle to achieve connection and disconnection of the cable from the spare tire and, accordingly, a considerable axial length of drum is required to accommodate the total length of cable, and a considerable amount of rotation of the drum is required to initially rewind the excess cable thereonto prior to the loading of the drum to elevate the tire from ground to its stored position. Additionally, the length of the drum creates problems with respect to mounting and operating the mechanism, especially in small vehicles. While the length of the reel or drum can be reduced by providing for the convolutions of cable to be wound on top of one another like a fishing reel, the latter defeats the purpose of the small diameter drum. In this respect, when the excess cable has been wound onto the drum to the point where the tire is to be elevated from ground, the build-up of cable has positioned the latter a considerable distance radially outwardly of the drum axis, thus increasing the torque on the drum and the force required to rotate the latter to elevate the tire.

SUMMARY OF THE INVENTION

An improved cable and drum type spare tire handling mechanism is provided in accordance with the present invention which optimizes the rewinding of cable during return of a tire to its stored position beneath the vehicle chassis by minimizing rotation of the drum during the retrieval of excess cable and then automatically minimizing torque on the drum during that portion of the rewinding during which the tire is elevated from ground. At the same time, the improvement according to the present invention provides for these advantages to be achieved with a relatively short axial length of cable drum, thus promoting selectivity with respect to the location of the mechanism relative to the vehicle and enabling mounting of the drum on the vehicle with the drum axis either horizontal or vertical.

More particularly in accordance with the present invention, the foregoing advantages are achieved by providing for the cable drum to have axially adjacent portions of different diameter. The two drum portions are arranged relative to one another for rotation of the drum in the direction of winding of the cable thereonto to provide for the initial winding to be on the larger diameter portion and for the winding at the point at which the tire is elevated from ground toward the storage position to be on the smaller diameter portion of the drum. This advantageously provides for the excess cable needed to enable withdrawal of the tire from beneath the vehicle to be quickly wound onto the drum with minimum rotation of the drum, and for rotation of the drum during elevation of the tire from ground to its storage position to be achieved with minimum torque on the drum so as to minimize the force required to rotate the drum during the elevating operation. By providing for the excess cable to be wound onto the large portion of the drum, the axial length of the drum necessary to accommodate this portion of the cable is reduced, whereby the overall length of the drum is reduced. This enables more selectivity with respect to mounting locations for the drum on a vehicle and orientation of the drum axis with respect to horizontal or vertical and, in any event, advantageously reduces the mounting space required in the direction of the drum axis.

Transition of the cable from the larger diameter to the smaller diameter portion of the drum during winding rotation thereof is automatic and can take place abruptly or gradually over a predetermined angular rotation of the drum in the winding direction. Preferably, such transition is gradual to provide smoothness in connection with continued rotation of the drum, and such gradual transition is preferably achieved by providing a helical cable ramp between the larger and smaller diameter portions of the drum.

It is accordingly an outstanding object of the present invention to provide an improved spare tire handling mechanism of the character comprising a cable and drum arrangement for displacing a spare tire between a stored position beneath a vehicle chassis and an accessible position in which the tire engages ground.

Another object is the provision of a spare tire handling mechanism of the foregoing character which requires less rotation of the cable drum and thus less energy than heretofore necessary in connection with winding of the cable onto the drum to displace a tire from the accessible to the stored position thereof.

A further object is the provision of a spare tire handling mechanism of the foregoing character which enables the rapid winding of excess cable onto the drum under no or minimum load conditions on the drum, and the winding of cable onto the drum under a maximum load condition with minimum force requirement in connection with rotation of the drum.

Yet another object is the provision of a spare tire handling mechanism of the foregoing character which provides increased selectivity with respect to areas of mounting location on a vehicle and orientation of the drum axis.

Still another object is the provision of a spare tire handling mechanism of the foregoing character in which the total length of cable required for the mechanism is accommodated on the drum in a shorter axial space than heretofore required while advantageously enabling application of minimum torque on the drum when the latter is rotated under load.

Still a further object is the provision of a spare tire handling mechanism of the foregoing character comprising a cable drum having axially adjacent drum portions of different diameters oriented relative to one another for rotation of the drum in the cable winding direction to provide for a first portion of the cable to be wound onto the larger diameter portion of the drum followed by transition of the cable to the smaller diameter portion of the drum for a second portion of the cable to be wound thereon to achieve elevation of a tire from ground to its stored position beneath the vehicle.

BRIEF DESCRIPTION OF THE DRAWINGS

The foregoing objects and others will in part be obvious and in part pointed out more fully hereinafter in conjunction with the written description of a preferred embodiment of the invention illustrated in the accompanying drawings in which:

FIGS. 7–10 are schematic illustrations of the relationships between the drum, cable and spare tire during use of the mechanism.

DESCRIPTION OF THE PREFERRED EMBODIMENT

Figure 1:
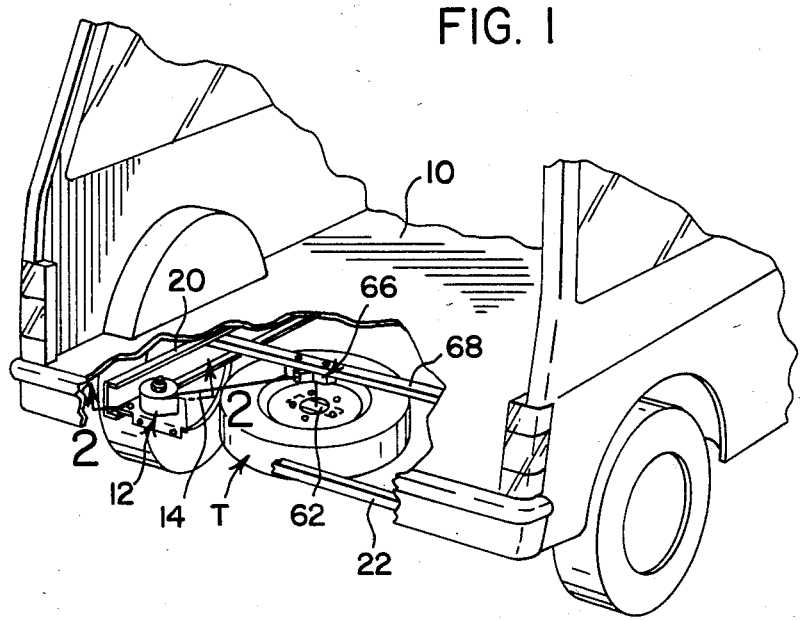
FIG. 1 is a perspective view of the rear portion of a vehicle provided with a spare tire handling mechanism according to the present invention.

With reference now in greater detail to the drawings wherein the showings are for the purpose of illustrating a preferred embodiment of the invention only and not for the purpose of limiting the invention, FIG. 1 illustrates the rear portion of an automobile having a spare tire T stored in accordance with the present invention beneath floor panel 10 of the vehicle by means of a spare tire handling mechanism comprising a drum unit 12 and a cable 14. As will become apparent hereinafter, a cable drum component of the drum unit is rotatable in opposite directions to achieve the winding and unwinding of cable 14 relative thereto, and the outer or free end of cable 14 is releaseably interengaged with tire T to support the tire in its stored position and to enable separation of the cable from the tire when the latter is lowered to an accessible position on the ground beneath the vehicle.

Figure 2:
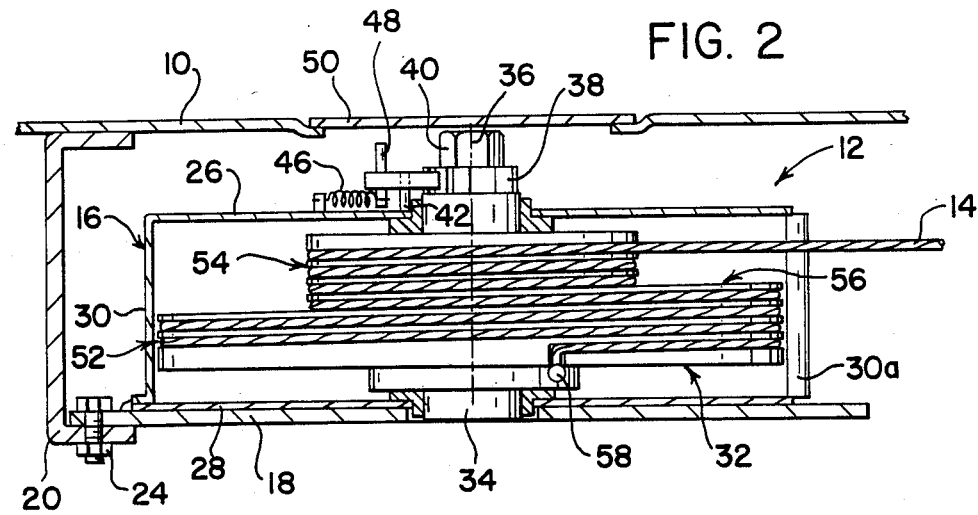
FIG. 2 is a sectional elevation view of the mechanism taken along line 2—2 in FIG. 1.
Figure 3:
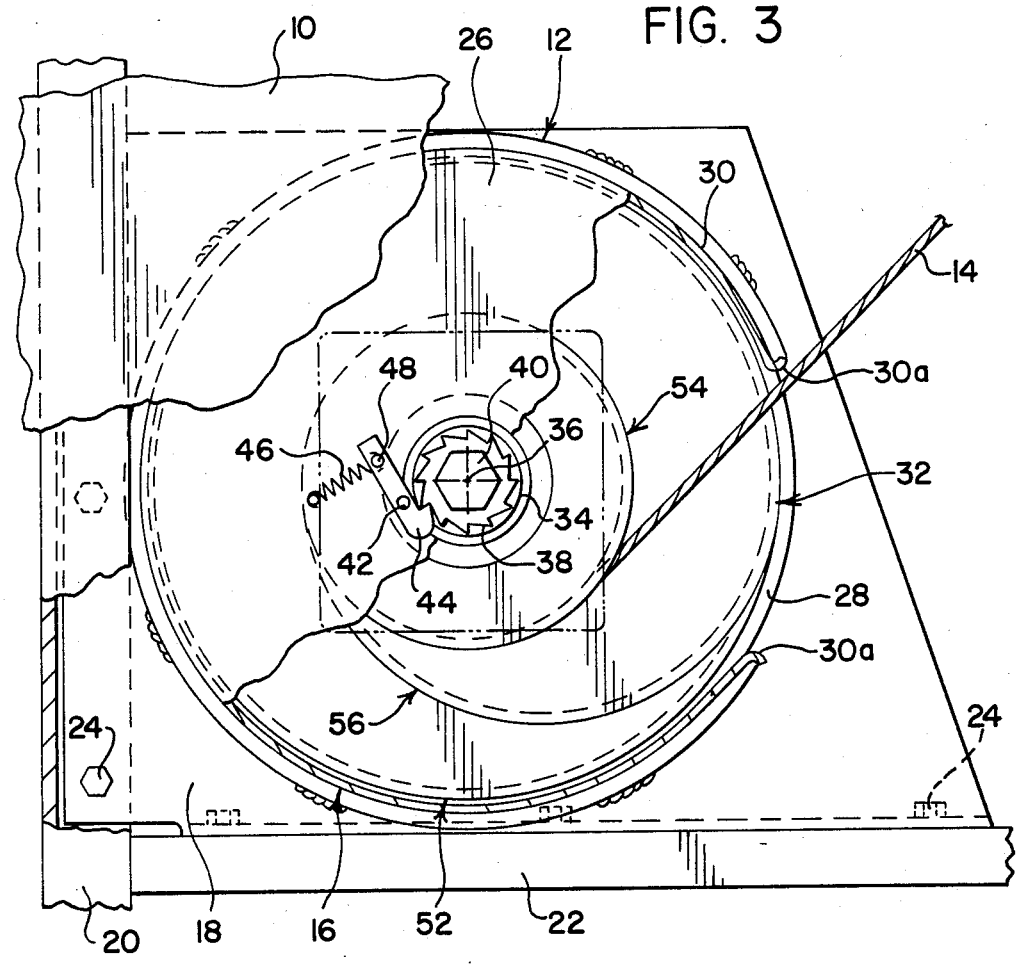
FIG. 3 is a plan view of the mechanism.

As will be appreciated from FIGS. 1–3 of the drawing, drum unit 12 includes a sheet metal housing 16 suitably secured such as by welding to a support bracket 18 by which the drum unit is mounted on the vehicle beneath floor panel 10. For purposes of illustration only in connection with such mounting, bracket 18 is shown as being attached to a side frame member 20 of the vehicle and a cross frame member 22 by nut and bolt assemblies 24. Housing 16 includes top and bottom walls 26 and 28, respectively, and a peripheral side wall 30 which is provided with a cable opening defined by circumferentially spaced apart flanges 30a which extend between top and bottom walls 26 and 28. Drum unit 12 further includes a cable drum 32 keyed or otherwise secured to a drum shaft 34 which is supported by housing 16 for rotation about vertical drum axis 36. In the embodiment illustrated, such rotational support is provided by openings in top wall 26 and bottom wall 28 of the housing through which corresponding ends of shaft 34 extend, and suitable bearing components interposed between shaft 34 and the corresponding wall opening.

The upper end of shaft 34 is provided with a ratchet wheel 38 and a tool engaging post 40 by which the shaft is adpated to be engaged with a suitable tool providing a crankarm by which the shaft and thus drum 32 are rotatable about axis 36. A pawl component is pivotally mounted on top wall 26 by means of a pin 42 and includes nose portion 44 normally biased into engagement with ratchet wheel 38 by means of a spring 46. An operating lever 48 at the opposite end of the pawl from nose 44 provides for disengaging nose 44 from ratchet wheel 38 for the purpose set forth hereinafter. Mounting of the drum unit preferably provides for tool post 40 to be closely adjacent floor panel 10 of the vehicle, whereby the tool post and pawl are readily accessible through an opening in the floor panel which can be normally closed by means of a removable cover 50. As will be described in greater detail hereinafter, clockwise rotation of drum 32 as seen in FIG. 3 provides for the winding of cable 14 onto the drum, and the teeth on ratchet wheel 38 are oriented relative to nose 44 of the pawl to prevent rotation of the drum in the direction to unwind the cable therefrom.

Figure 6:
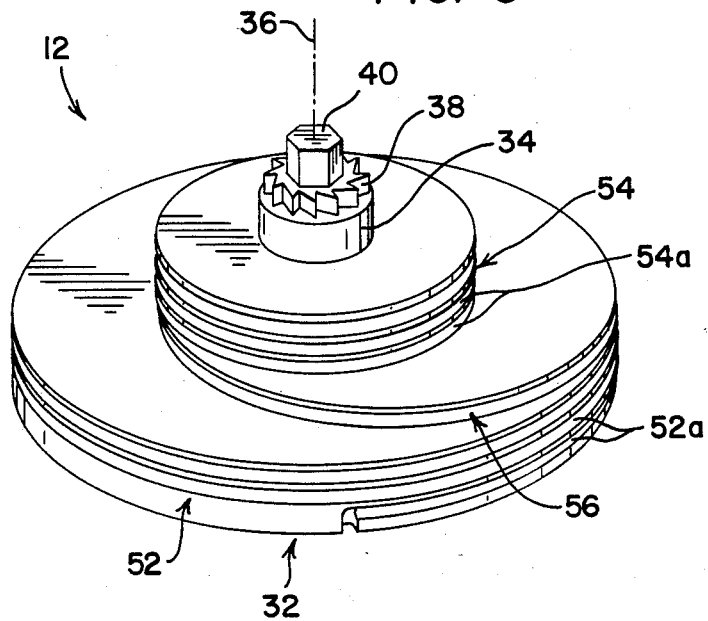
FIG. 6 is a perspective view of the cable drum of the mechanism.

As will be appreciated from FIGS. 2, 3 and 6 of the drawing, cable drum 32 is comprised of a first drum portion 52 and a second drum portion 54, which drum portions are axially adjacent and respectively of larger and smaller diameter. In the embodiment disclosed, drum portions 52 and 54 are provided with corresponding cable grooves 52a and 54a, and a grooved helical ramp 56 provides for the transition of cable 14 between drum sections 52 and 54 in response to rotation of the drum in opposite directions about axis 36. Cable 14 has an inner end 58 fastened to cable drum 32 along the axially outermost cable groove 52a of larger diameter portion 52 whereby, for the purpose which will become apparent hereinafter, winding rotation of drum 32 clockwise as seen in FIG. 3 sequentially winds cable 14 onto the first and larger diameter portion 52 of the drum and then, following transition by means of ramp 56, onto the second and smaller diameter portion 54 of the drum.

Figure 4:
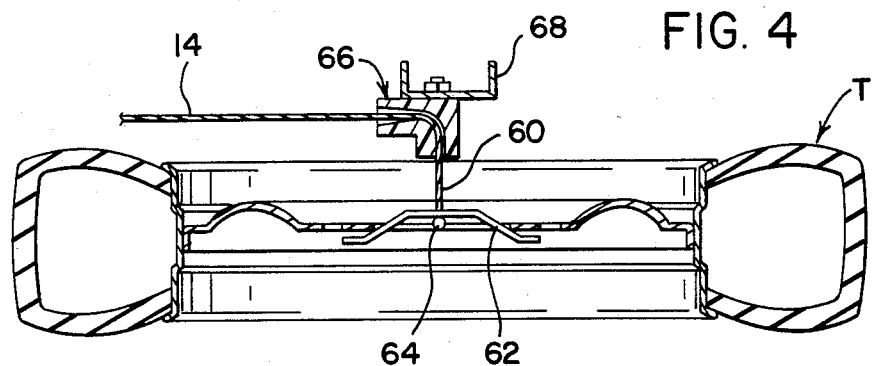
FIG. 4 is a sectional elevation view through the tire and cable guide.
Figure 5:
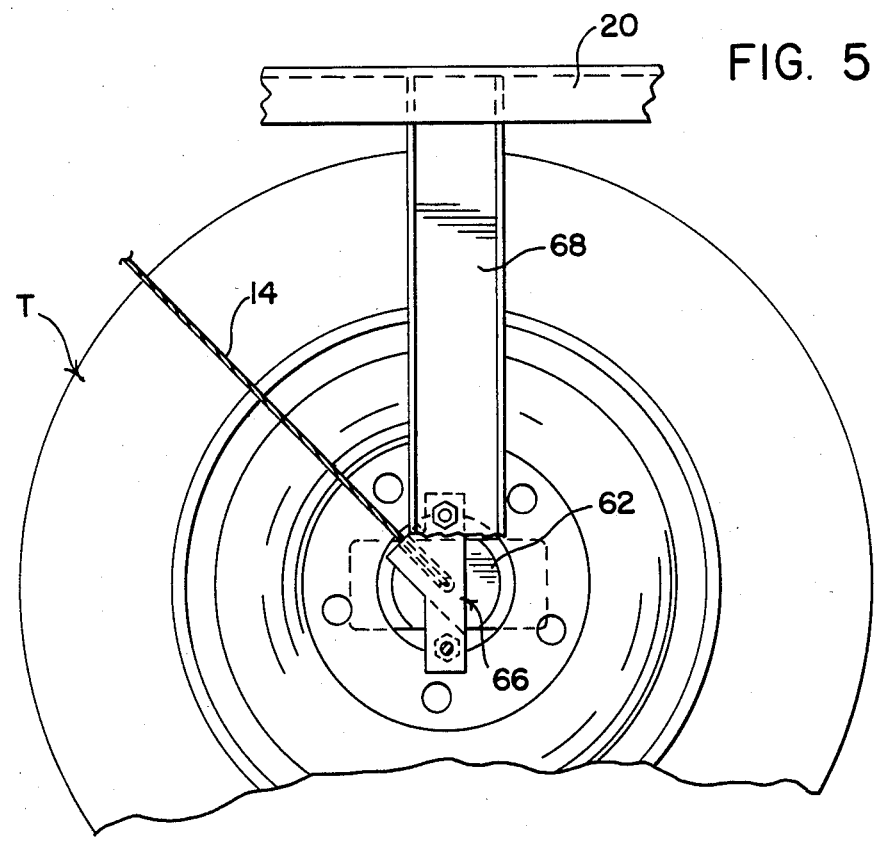
FIG. 5 is a plan view of the tire and cable guide.

As best seen in FIGS. 4 and 5 of the drawing, the outer or free end 60 of cable 14 is provided with a suitable tire engaging and supporting component 62 having an opening through which the end extends and which is loosely retained on the cable end such as by means of an enlargement 64 on the cable end. Support component 62 has a contour which enables the component to be introduced through the central opening in the rim of the spare tire and then repositioned to engage the edges of the opening, thus to enable the tire to be elevated or supported in suspension by cable 14. Cable 14 extends through a cable guide 66 which, in the embodiment shown, is mounted on a cross frame member 68 which extends between the side frame members of the vehicle. Cable guide 66 is mounted in a position providing the center of the storage area for the spare tire beneath the vehicle chassis, and it will be appreciated that the cable guide serves to translate the horizontal displacement of cable 14 from drum 32 to the necessary vertical cable disposition for supporting tire T. While guide 66 is shown as being an apertured component through which cable 14, slides, it will be appreciated that a pulley or similar rotatable support could be used for the same purpose.

From the foregoing description of the structure of the tire handling mechanism, it is believed that the following description of the operation of the mechanism will be readily understood from the schematic illustrations in FIGS. 7-10 of the drawing. With reference to the latter Figures, FIG. 7 illustrates the positional relationships between the component parts of the mechanism when tire T is in its stored position beneath the chassis of the vehicle and above ground G and forwardly of the rear end of the vehicle as represented by broken line V. In the stored position of the tire, cable 14 is wound onto both the large diameter and small diameter portions of drum 32 for the free end of the cable to extend from small diameter portion 54 to tire T. In this position of the component parts, nose 44 of the pawl engages ratchet wheel 38 to prevent unwinding rotation of drum 32.

When it is desired to remove the spare tire from its stored position, such as to replace a flat tire on the vehicle, the pawl is pivoted about pin 42 by means of lever 48 to release nose 44 from ratchet wheel 38, whereby drum 32 is free to rotate in the unwinding direction. Drum 32 will rotate in the latter direction under the weight of tire T, and the tire will thus descend to the position shown in FIG. 8. The latter provides a first accessible position in which the tire engages ground vertically beneath the storage position. As will be seen in FIG. 8, descent of tire T to the first accessible position unwinds cable 14 from small diameter portion 54 of drum 32. While the pawl is in its released position, tire T is pulled laterally from the first accessible position to a second accessible position shown in FIG. 9 and in which the tire is behind the vehicle. As will be appreciated from FIG. 9, displacement of tire T to the second accessible position unwinds cable 14 from large diameter portion 52. This position of tire T enables unobstructed manipulation of tire support component 62 to separate the latter from the tire, whereby the tire is freed for movement to the location of use.

Figure 9:
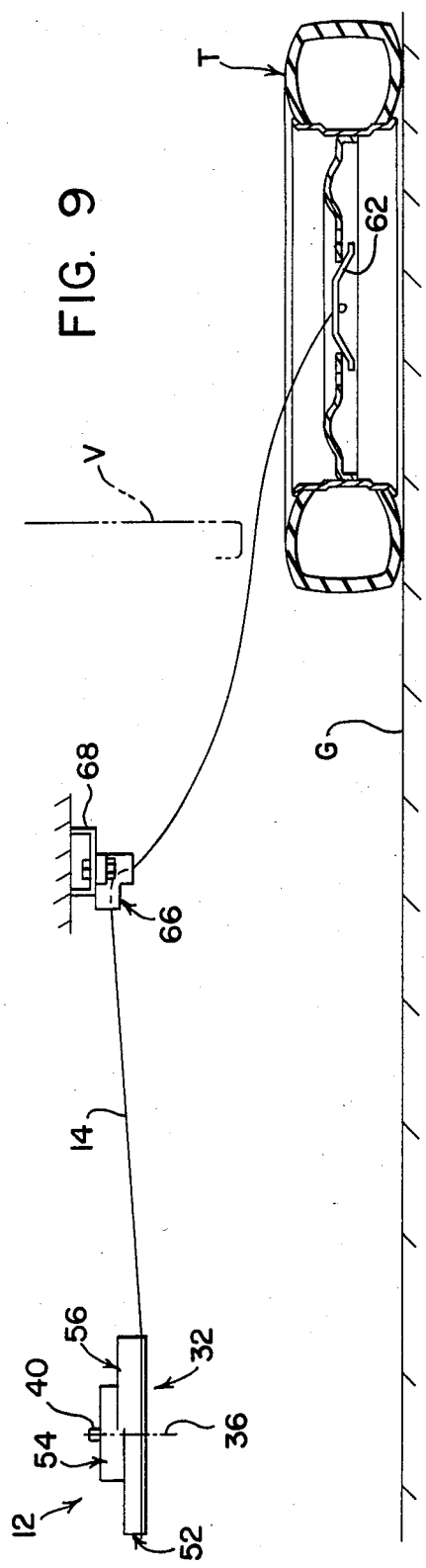
Figure 10:
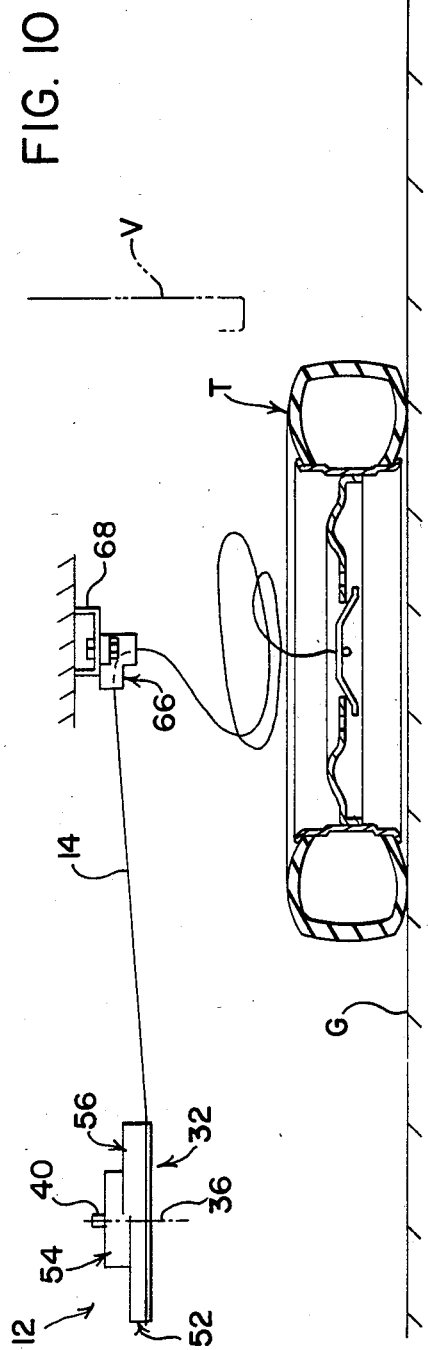

When the tire of the vehicle has been changed the flat tire is brought to the second accessible position behind the vehicle and support component 62 is interengaged therewith to reposition the components as shown in FIG. 9. The tire is then pushed forwardly under the vehicle to the position shown in FIG. 10 in which the tire is in the first accessible position generally beneath the storage position thereof. As shown in FIG. 10, this positioning of the tire provides excess cable between the tire and cable guide 66. In order to displace the tire back to the stored position thereof, the pawl is actuated for nose 44 to re-engage ratchet gear 38 and, in the embodiment shown, cable drum 32 is rotated in the winding direction through the use of an appropriate crankarm engaged with tool post 40 on the drum shaft. This provides for cable 14 to be rewound onto large diameter portion 52 of drum 32 until the component parts are in the positions shown in FIG. 8 of the drawing. At this point, the excess cable has been wound onto large diameter portion 52 of the drum and along ramp 56 to position the cable for further rotation of the drum to wind the cable on smaller diameter portion 54. When the component parts are in the positions shown in FIG. 8 during the rewinding operation, further rewinding elevates the tire from ground. It will be appreciated therefore that the cable is wound onto the smaller diameter portion 54 when the drum is loaded by the weight of tire T as the latter is elevated from the position in FIG. 8 to the stored position in FIG. 7. Accordingly, it will be further appreciated that initial winding of cable 14 onto drum 32 in displacing the cable from the position shown in FIG. 10 to the position shown in FIG. 8 is achieved rapidly and with minimum rotation of drum 32, and that the elevating of the tire from the position shown in FIG. 8 to the stored position shown in FIG. 7 is at a slower rate but with a minimum force requirement with respect to rotating the drum. Thus, the work in connection with returning a tire to its stored position is achieved with minimum time and effort in comparison with the time and effort which would be required with a drum having a uniform diameter throughout its length.

It will be appreciated that the mechanical advantage achieved by stepping the cable to the smaller diameter portion of the drum during return of the tire to its stored position is dependent in part on the length of the crankarm or other mechanism by which drum 32 is rotated. While a tool post 40 is illustrated in the disclosed embodiment to receive a crankarm by which the drum would be directly rotated, it will be appreciated that the mechanical advantage can be further enhanced by rotating the drum through an appropriate gear train having a gear ratio which would require a lesser exertion of force by the person doing the work. It will likewise be appreciated that drum 32 could be rotated by a suitable motor in the winding direction or in both the winding and unwinding directions, whereby the tire would be lowered to ground at a lesser speed than the speed of its fall by gravity. The stepped drum would of course minimize the load on the drive motor during rotation of the drum with the tire in suspension above ground.

While helical ramp 56 in the disclosed embodiment is illustrated as having a transition angle of about 180° between the large and small diameter portions of the drum, it will be appreciated that the transition could be abrupt as opposed to gradual and that the degree of graduality could be lesser or greater than that provided by the 180° transition angle. Graduality with respect to the transition is desirable from the standpoint of continuity of smoothness with respect to rotation of the drum and translation of the cable between the different diameter portions. In connection with a winding operation, a gradual transition negates abruptness with respect to the imposition of full load on the drum and thus the abruptness of the change in the force required to rotate the loaded drum.

It will be further appreciated that any desired ratio of diameters between the larger and smaller diameter portions of the drum can be used and that such ratio will depend on a number of factors. Such factors include the total length of cable to be accommodated on the drum, the length of excess cable necessary to position the tire rearwardly of the vehicle for separation from the cable, and the vertical height of the storage area above ground and which height determines the length of cable to be wound on the small diameter portion. Generally, the diameter of the large diameter portion will be such as to accommodate the excess cable with a minimum required axial length of the large diameter portion, and the smaller diameter portion will be such as to achieve the same in connection with the length of cable required to elevate the tire to its stored position while providing an acceptable force requirement with respect to rotating the loaded drum. The latter of course will vary depending on the weight of the tire.

While it is preferred to provide for the outer surface of the large and small diameter portions of drum 32 to be grooved as shown herein, such grooving is not necessary but is preferred in that it enhances guidance of the positioning of the convolutions of the cable on the drum during winding and unwinding operations. Further in connection with the illustrated embodiment, it will be appreciated that devices other than the ratchet and pawl arrangement shown can be employed to maintain the drum against rotation in the unwinding direction when the spare tire is in its stored position, and that arrangements other than the housing as shown herein can be employed to support the cable drum for rotation. It will likewise be understood that the mounting location of the drum unit will vary depending on structural aspects of a given vehicle and that the mechanism is operable as described herein with the cable drum rotatable either about a vertical or horizontal axis.

Since many embodiments of the present invention can be made, and since many changes can be made in the embodiment herein illustrated and described, it is to be distinctly understood that the foregoing descriptive matter is to be interpreted merely as illustrative of the present invention and not as a limitation.

Having thus described the invention, it is claimed:

1. In a spare tire handling mechanism of the character mounted on a vehicle for displacing a spare tire between stored and accessible positions relative to the vehicle and comprising rotatable drum means and cable means attached at one end to said drum means and having other end means detachably engagable with a spare tire, whereby said tire is displaceable from said accessible to said stored position in response to rotation of said drum means in one direction and from said stored to said accessible position in response to rotation of said drum means in the direction opposite said one direction, the improvement comprising: said drum means having axially adjacent first and second drum portions onto which said cable means is sequentially wound, first onto the first portion then onto the second portion, in response to rotation of said drum means in said one direction, said first drum portion having a larger diameter than said second drum portion, and the load on said cable means by said spare tire being greater during winding of said cable means on said second portion than during winding of said cable means on said first portion.

2. A spare tire handling mechanism according to claim 1, wherein each said first and second drum portions receives a plurality of convolutions of said cable means in axially adjacent relationship.

3. A spare tire handling mechanism according to claim 1, and ramp means for guiding displacement of said cable means between said first and second drum portions.

4. A spare tire handling mechanism according to claim 1, wherein each said first and second drum portions includes groove means to guide winding and unwinding of said cable means relative thereto.

5. A spare tire handling mechanism according to claim 4, wherein said groove means are axially juxtaposed.

6. A spare tire handling mechanism according to claim 4, and ramp means for guiding displacement of said cable means between said first and second drum portions.

7. A spare tire handling mechanism according to claim 6, wherein said ramp means has a helical curvature between said first and second drum portions.

8. A spare tire handling mechanism according to claim 7, wherein said groove means are axially juxtaposed and said ramp means is grooved.

9. A spare tire handling mechanism according to claim 1, wherein said accessible position of said tire includes a first position engaging ground vertically beneath said stored position and a second position engaging ground laterally of said first position, said cable means having a first portion extending from said drum means toward said tire when said tire is in said first position and a second portion between said first portion and said drum means when said tire is in said second position, said second and first cable portions being sequentially wound on said first and second drum portions in response to rotation of said drum means in said one direction.

* * * * *